United States Patent
Seidman et al.

(10) Patent No.: US 8,046,760 B2
(45) Date of Patent: Oct. 25, 2011

(54) LOCK CONTENTION PINPOINTING

(75) Inventors: David Isaiah Seidman, Sunnyvale, CA (US); Piotr Findeisen, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1863 days.

(21) Appl. No.: 10/887,621

(22) Filed: Jul. 9, 2004

(65) Prior Publication Data

US 2006/0010444 A1    Jan. 12, 2006

(51) Int. Cl.
*G06F 9/46* (2006.01)
*G06F 9/455* (2006.01)
*G06F 7/00* (2006.01)
*G06F 9/44* (2006.01)

(52) U.S. Cl. ............ 718/102; 718/1; 718/104; 707/704; 717/127; 717/130; 717/131

(58) Field of Classification Search ...... 718/1, 100–104; 707/8; 703/22; 717/130–131, 127
See application file for complete search history.

(56) References Cited

U.S. PATENT DOCUMENTS

| | | | |
|---|---|---|---|
| 5,524,247 A * | 6/1996 | Mizuno | 710/200 |
| 5,940,828 A | 8/1999 | Anaya et al. | |
| 6,119,115 A * | 9/2000 | Barr | 707/8 |
| 6,223,200 B1 | 4/2001 | Barnes et al. | |
| 6,338,063 B1 * | 1/2002 | Barr | 707/8 |
| 6,457,142 B1 * | 9/2002 | Klemm et al. | 714/38 |
| 6,473,849 B1 | 10/2002 | Keller et al. | |
| 6,601,120 B1 | 7/2003 | Schimmel | |
| 6,735,760 B1 * | 5/2004 | Dice | 717/139 |
| 6,751,789 B1 * | 6/2004 | Berry et al. | 717/130 |
| 6,785,889 B1 * | 8/2004 | Williams | 718/104 |
| 6,883,020 B1 * | 4/2005 | Taranto et al. | 709/213 |
| 7,051,026 B2 * | 5/2006 | Berry et al. | 707/8 |
| 7,086,064 B1 * | 8/2006 | Stevens | 719/310 |
| 7,159,220 B2 * | 1/2007 | Buch | 718/104 |
| 7,167,821 B2 * | 1/2007 | Hardwick et al. | 703/22 |
| 7,278,057 B2 * | 10/2007 | Betancourt et al. | 714/38 |
| 7,318,220 B2 * | 1/2008 | Mehaffy et al. | 717/127 |
| 7,506,317 B2 * | 3/2009 | Liang et al. | 717/130 |
| 2001/0014905 A1 * | 8/2001 | Onodera | 709/102 |
| 2003/0005028 A1 * | 1/2003 | Dritschler et al. | 709/104 |
| 2003/0065704 A1 * | 4/2003 | Buch | 709/107 |
| 2003/0114949 A1 * | 6/2003 | Armstrong et al. | 700/107 |
| 2004/0123303 A1 * | 6/2004 | Trotter | 719/315 |
| 2005/0097294 A1 * | 5/2005 | Hepkin | 711/170 |
| 2005/0198005 A1 * | 9/2005 | Demsey et al. | 707/2 |

OTHER PUBLICATIONS

Bershad et al., "An Open Environment for Building Parallel Programming Systems", ACM, 1998, pp. 1-9.*
Liang et al., "Comprehensive Profiling Support in the Jave Virtual Machine", USENIX, 1999, pp. 1-13.*
Harkema et al., "Performance Monitoring of Java Applications", WOSP 2002, pp. 114-127.*
Viswanathan et al, "Java Virtual Machine Profiler Interface", IBM Systems Journal, vol. 39, 2000, pp. 82-95.*

* cited by examiner

*Primary Examiner* — Jennifer To

(57) ABSTRACT

One embodiment disclosed relates to a method of finding lock contention in an application with concurrent threads. Status data is retrieved by periodically sampling status of said threads. The periodically-sampled status data is accumulated, and the lock contention is statistically found from the accumulated status data. The status data may include location information that is usable to pinpoint the lock contention.

21 Claims, 4 Drawing Sheets

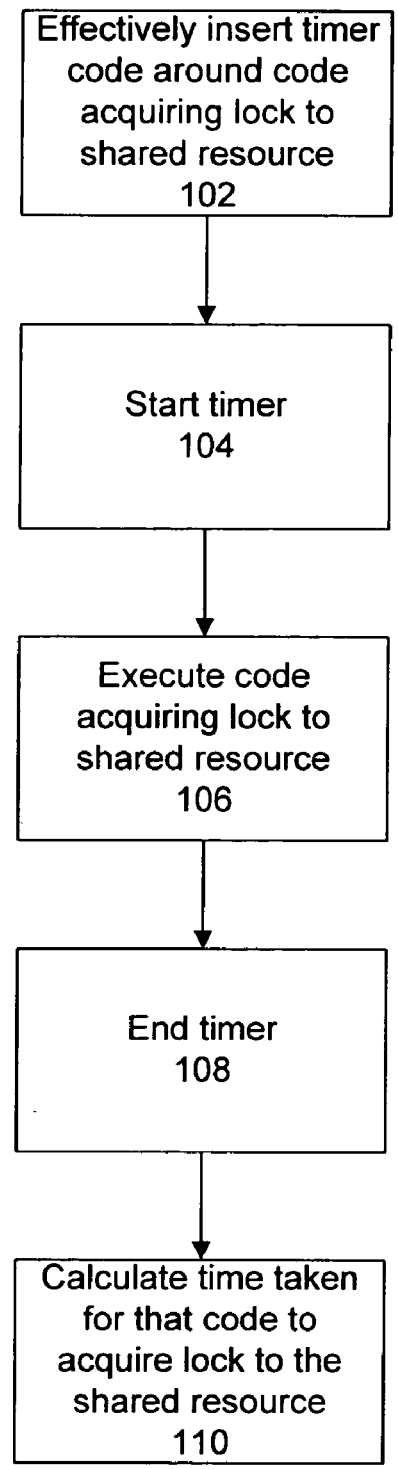
FIG. 1
(Conventional)

LOCK CONTENTION PINPOINTING

BACKGROUND OF THE INVENTION

1. Field of the Invention

The present invention relates generally to computer software and improving the performance thereof.

2. Description of the Background Art

A thread in a program is a part being executed independently of other parts. In a multi-threaded environment, the multi-threaded parts are executed concurrently.

Java applications frequently use concurrent threads. When these threads need controlled access to a shared resource, a lock (or monitor) is typically used.

It is not uncommon in such situations for threads to spend inordinate time waiting to acquire a lock, needlessly wasting computing resources. Detecting such inefficient conditions is very valuable to developers and operators of Java applications.

SUMMARY

One embodiment disclosed relates to a method of finding lock contention in an application with concurrent threads. Status data is retrieved by periodically sampling status of said threads. The periodically-sampled status data is accumulated, and the lock contention is statistically found from the accumulated status data. The status data may include location information that is usable to pinpoint the lock contention.

BRIEF DESCRIPTION OF THE DRAWINGS

FIG. 1 is flow chart depicting a conventional technique.

DETAILED DESCRIPTION

Figure 2:
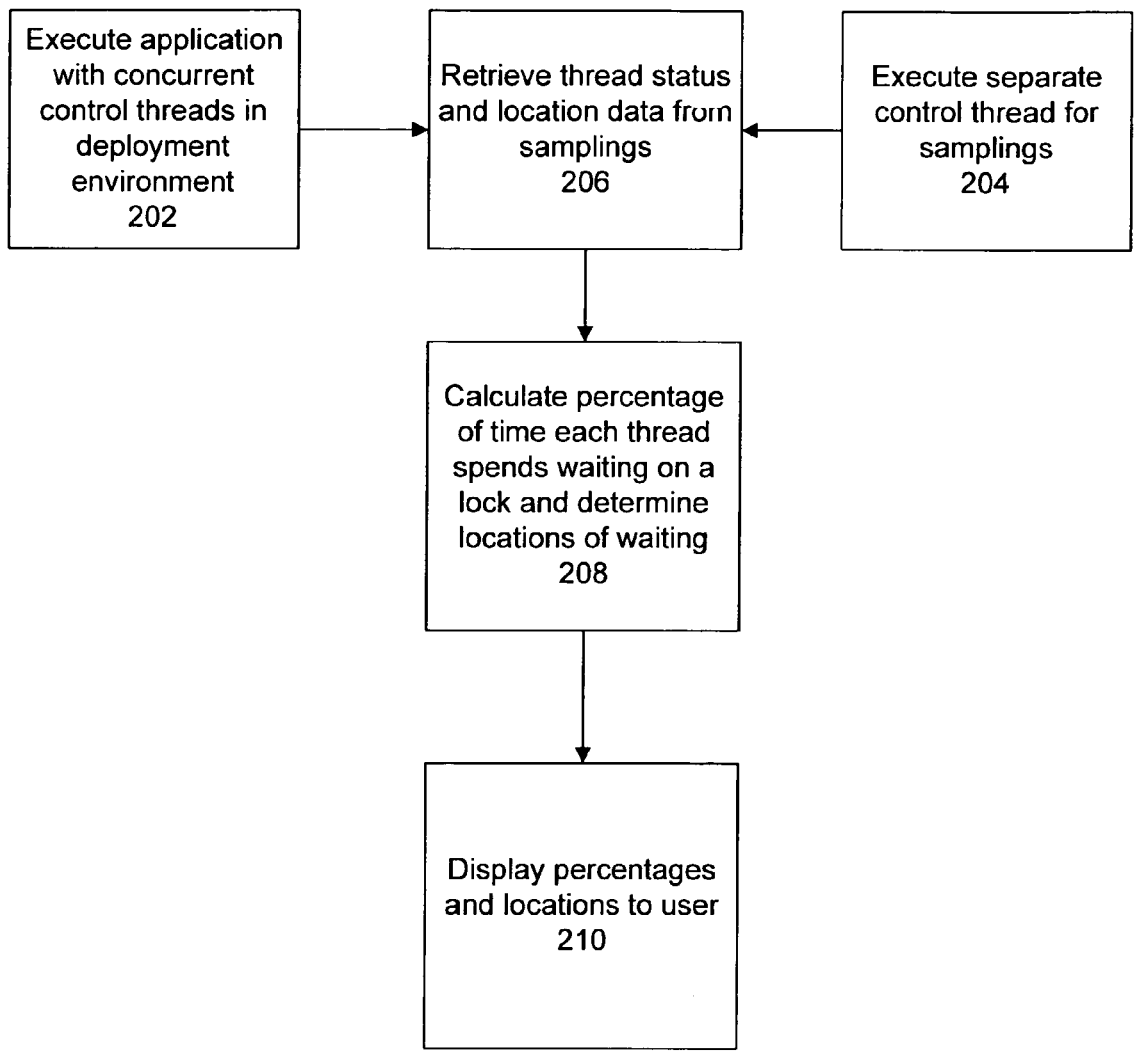
FIG. 2 shows a high-level flow chart of the technique in accordance with an embodiment of the invention.

As discussed above, lock contention problems can occur in multi-threaded Java applications. Unfortunately, such lock contention problems frequently occur in deployed web applications, i.e., in an application that is actively serving users. This creates the following practical constraints in detecting such problems.

First, the lock contention analysis should not unduly degrade the performance of the running application. In other words, the problem should be detected and pinpointed with very little performance degradation for the application. The performance degradation should be less than 5%, or preferably less than 1%, or even lower.

Second, operators of data centers, where web applications are frequently hosted, do not typically have sophisticated debugging knowledge, and they are typically under pressure to quickly diagnose a performance problem. Therefore, it is highly desirable to inform them exactly where the lock contention may be occurring as soon as possible once the contention begins.

Unfortunately, existing solutions appear to be either too intrusive to the application, or do not give the operator enough information. In accordance with an embodiment of the invention, these limitations are overcome with a solution that uses a sampling technique to provide highly accurate information about lock contention problems with very low performance overhead.

In contrast to the sampling technique of an embodiment of the present invention, a conventional technique for determining a lock contention problem is depicted by the flow chart of FIG. 1. As shown in FIG. 1, the conventional technique 100 typically involves the insertion or effective insertion (102) of timer code before and after the application code which acquires a lock or monitor to the shared resource. This insertion may be performed, or effectively accomplished, within the Java Virtual Machine (JVM). Note that a JVM is built on and adapted for a particular computing platform.

When the application is run with the timer code inserted therein, a timer is started (104) just prior to the pertinent application code being run. That application code is then executed (106) so as to acquire a lock to the shared resource. After successful execution (i.e. after the access has been completed), the timer is stopped (108).

A calculation (110) may then be made as to the time taken for that code to acquire the lock to the shared resource. The time taken is indicative of the time spent waiting on a lock.

Unfortunately, the above-discussed conventional technique to pinpoint lock contention is disadvantageous. The conventional solution has a high overhead that substantially reduces performance of deployed applications. This disadvantage is particularly problematic because lock contention problems often appear when an application endures the stresses of actual deployment and may not appear when the application is running in a development environment. As a consequence, the conventional solution is implemented in the JVM for a specific computing platform.

Figure 3:
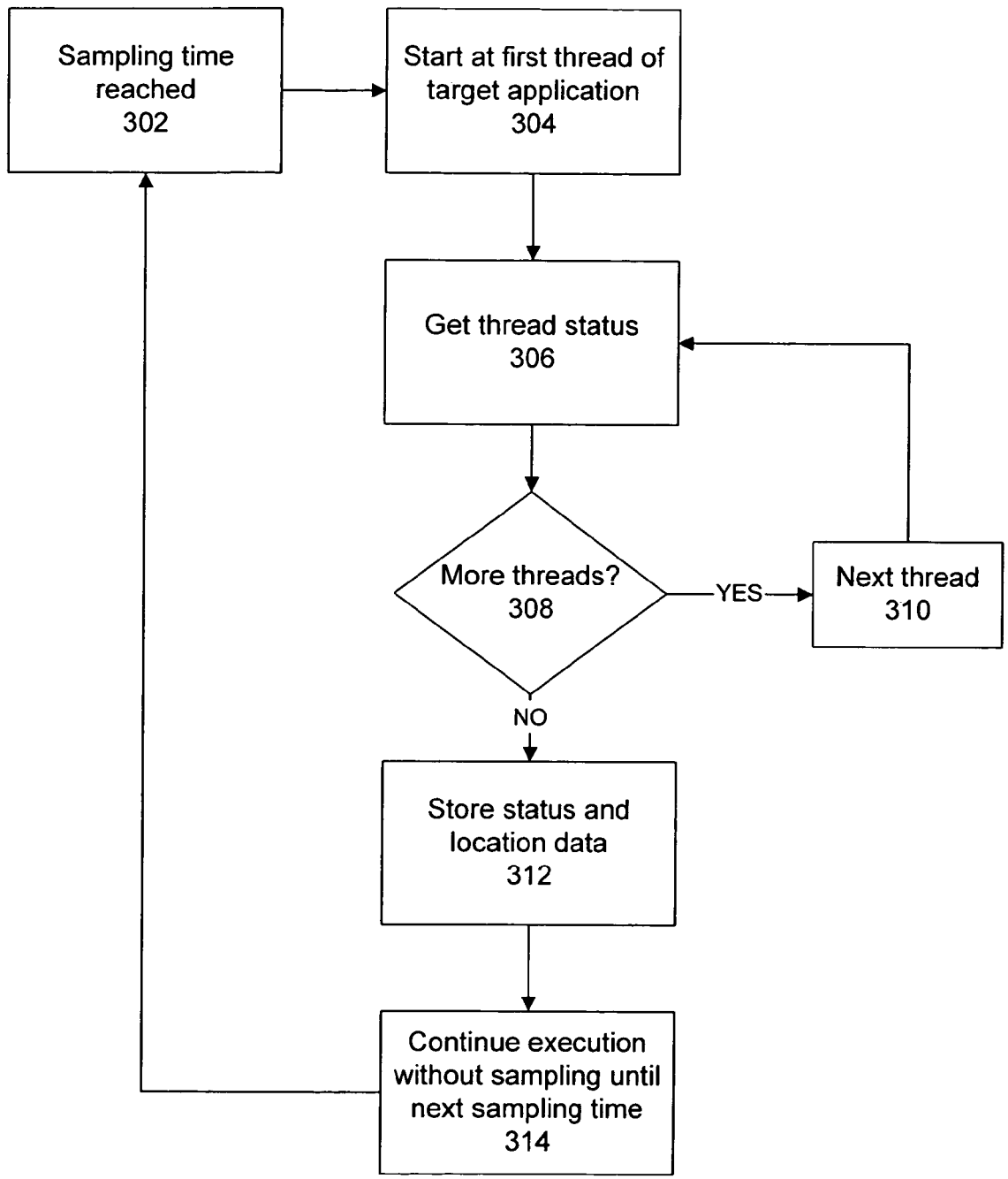
FIG. 3 depicts a sampling method in accordance with an embodiment of the invention.
Figure 4:
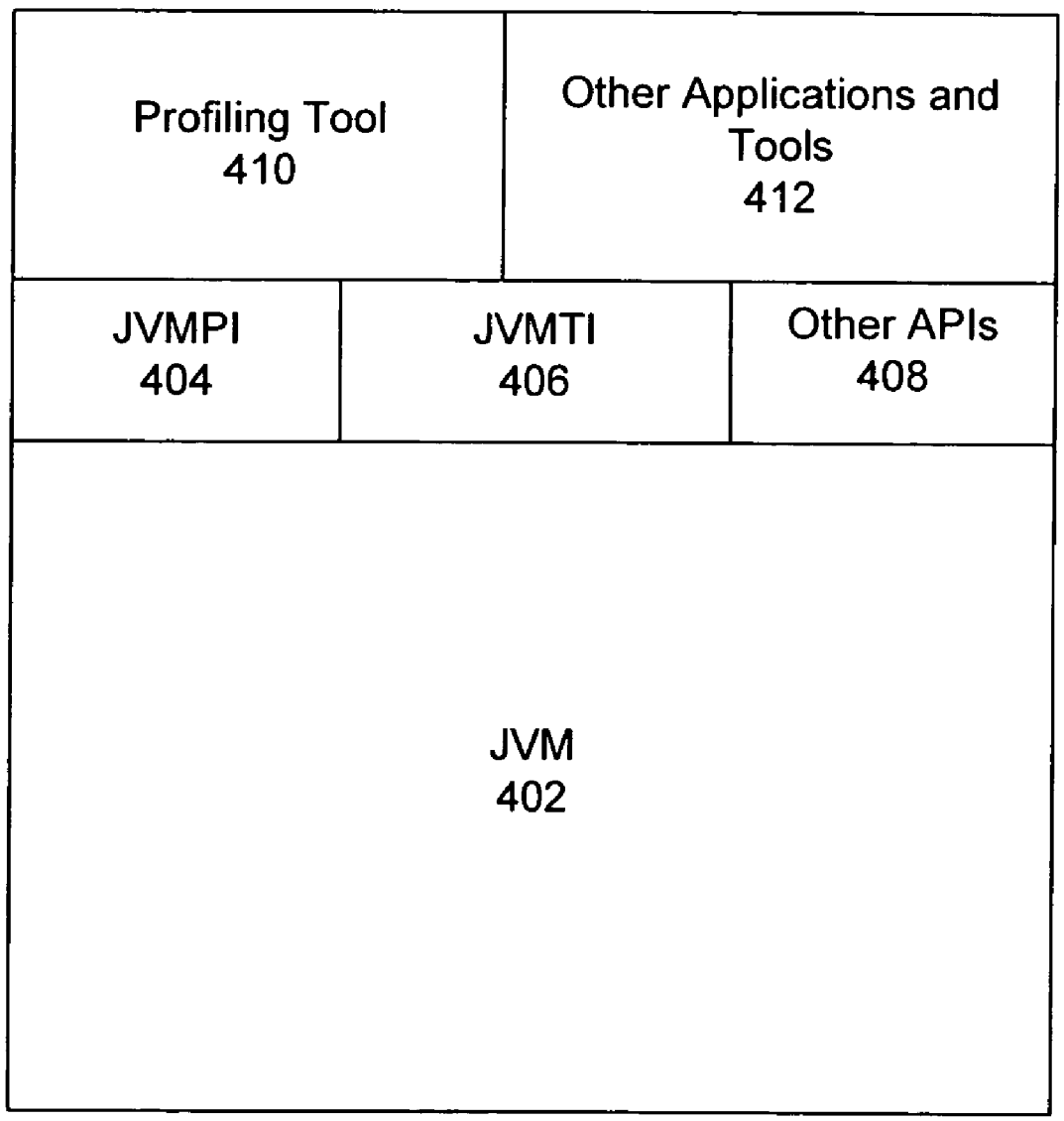
FIG. 4 is a schematic diagram showing example software layers of an implementation in accordance with an embodiment of the invention.

An embodiment of the invented solution is now described in relation to FIGS. 2, 3, and 4. The solution described has the advantage of using standard interfaces, and so can be widely used with different platforms. In addition, the solution described has low performance overhead, while remaining highly accurate. As such, the solution described can be used to monitor deployed applications.

FIG. 2 shows a high-level flow chart of the technique 200 in accordance with an embodiment of the invention. The target Java or other application with concurrent control threads may be executed (202) in a deployment environment. A process may include multiple threads that execute instructions on a processor according to program code. Unlike processes, threads of a process share the same address space. In other words, threads of a process can read and write the same variables and data structures. When coding a multithreaded program, care must be taken so that one thread does not interfere with another thread. In addition to the threads of the target application, a separate thread for samplings may be executed (204). This separate thread performs periodic sampling of the status and code location of the concurrent threads of the target application. One embodiment of the periodic sampling is discussed in further detail below in relation to FIG. 3.

When detection and/or pinpointing of lock contention is desired, the sampled status and code location data may be retrieved (206). The status data indicates the "state" of a thread at the sampling times. Example states include, but are not limited to: running, asleep, suspended, and monitor block (waiting on a lock). The location data may be used for debugging purposes and may be of a form indicating a program module (sometimes called method) and line number at the sampling times.

From the retrieved data, calculation (208) may be made of the percentages of time that each thread (or an aggregation of the threads) spent waiting on a lock and the locations (for example, module and line number) of the waiting may be determined. These percentages and locations may be displayed (210) to a user. The user may be, for example, an operator of the data center where the application is deployed. In particular, the module and line number information when a thread is in a monitor block state may be used to diagnose and/or solve a lock contention problem. In a particular embodiment, the user may be presented with a histogram, either per thread or aggregated, of most contended locks by percentage of time.

FIG. 3 depicts a sampling method 300 in accordance with an embodiment of the invention. When a periodic sampling time is reached (302), a loop is performed over the threads in the target application to get status information from each thread. The periodicity may be predetermined or set by a user. The more frequent the sampling, the quicker statistics are gathered. The less frequent the sampling, the less performance intrusion occurs with respect to the application.

Starting (304) at a first thread of the target application, the thread status is obtained (306). The thread status may be obtained, for example, using a call to a get thread status function. The status may include both the "state" of the thread and the location being executed therein (for example, by module name and line number). While there are more threads (308) whose status has not yet been gotten, the process 300 goes to a next thread (310) and gets its status until the status has been gotten from all the threads of the application. Then, the process 300 may go on to store (312) the status and code location data. The status and location data may be stored, for example, in a file that is electronically accessible by a tool or application to be used in monitoring the performance of the target application and/or debugging the target application.

In between the periodic samplings, execution of the target application continues (314) with no or minimal performance intrusion. The sampling process 300 starts again when the next sampling time is reached (302).

The above-discussed sampling may be performed infrequently relative to the frequency of instruction execution. For example, sampling several times per second should typically be sufficient for a typical application. For instance, once per 100 milliseconds (600 samples per minute) may be the periodicity. Since the threads are sampled only infrequently, overhead may be kept very low.

The status data may be collected infrequently because there is not a need to distinguish between many states. First, it can be coarsely determined whether a thread is spending time in monitors, which is relatively uncommon. Then, when a thread is seeing contention, it is probably only contending on a few monitors over its lifetime, and by seeing 600 samples per minute, these can be distinguished and ranked as well.

In accordance with an embodiment of the invention, the status data obtained comprises at first the "state" of the thread. In this embodiment, only when the state indicates that the thread is waiting on a monitor, then the location information is obtained. The location information may be obtained by examining the thread's topmost stack frame to determine the "method" (module) and line number of the monitor the thread is waiting on.

FIG. 4 is a schematic diagram showing example software layers of an implementation in accordance with an embodiment of the invention. The Java Virtual Machine (JVM) 402 is adapted to different computing platforms.

Above the JVM 402 is an application programming interface (API) layer. The API layer may include a Java Virtual Machine Profiler Interface (JVMPI) 404, a Java Virtual Machine Tools Interface (JVMTI) 406, and other APIs 408.

Above the API layer is an application layer. The application layer may include a profiling tool 410 (which may be registered and included with an application) and other applications and tools 412. The target application would be among these applications and tools 412.

In accordance with an embodiment of the invention, the profiling tool 410 may determine a thread's status (for example, running, waiting, and so on) by calling the "GetThreadStatus" function in the JVMPI 404. The profiling tool 410 may also determine what "method" (module) and line a thread is executing by calling the "GetCallTrace" function in the JVMPI 404. Other interfaces (instead of JVMPI) may also be used in alternate embodiments. For example, the profiling tool 410 may instead make calls to appropriate functions in the JVMTI 406.

In one embodiment, to filter out Java API calls that block on monitors to perform deliberately lengthy waits, the profiling tool 410 may filter out lock contention in methods (modules) that are not of interest to the user, e.g., in methods that the user did not write. These not-of-interest methods include modules in the java.* package, for example, and in general can be easily known to a user of the technology. In other words, the statistical data or conclusions displayed to a user would exclude information relating to lock contention in library modules and other modules that are not readily changeable by the user. This filtering ensures that a user sees useful, actionable lock-contention information.

The above-described use of event sampling provides an advantageous technique for accurate pinpointing of lock contention while monitoring a deployed application.

One might be concerned about whether sampling provides insufficient accuracy, but sufficient accuracy is provided so long as enough data is collected to provide the desired accuracy level. In general, the expected error in a set of sampling data is the square root of the number of samples. For example, if one has 100 samples in a voting poll, the expected margin of error is plus or minus 10%. With 600 samples (collected in one minute at a sampling rate of one sample per 100 milliseconds), the error rate falls to 4%, and with 6000 samples (collected in ten minutes at a sampling rate of one sample per 100 milliseconds), the error rate falls to 1%.

The frequency of sampling may be too infrequent to work well with short-lived threads. In one embodiment, the profiling tool 410 may aggregate statistics across a thread group including short-lived threads and so determine a type of average behavior for a thread in the group.

Although the above-description focuses on use of the invention in relation to a Java computing environment, an embodiment of the invention may be applied to other execution or runtime environments. These other environments may in particular include those that support determining thread status and location with little or no overhead when these functions are available but not in active use. For instance, an embodiment of the invention may be implemented for the .NET Common Language Runtime, and for other computing environments, depending on their profiling interfaces.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, implemented in a computer, of finding lock contention in a multi-threaded application, the method comprising:

retrieving, by the computer, status data by periodically sampling status of a plurality of threads in the multi-threaded application;

accumulating the periodically-sampled status data, wherein the status data includes location information; and finding, by the computer, the lock contention based on the accumulated periodically-sampled status data for each of the plurality of threads by calculating a percentage of time said each of the plurality of threads spent waiting on a lock and determining a location of the waiting.

2. The method of claim 1, wherein the status data further includes a thread state, wherein the method further comprises retrieving location information for a thread only if the status data indicates the thread is in a monitor block state.

3. The method of claim 2, wherein the multi-threaded application executes in a Java Virtual Machine and the location information is determined using a call to a function of a standard interface to the Java Virtual Machine.

4. The method of claim 3, wherein the standard interface comprises Java Virtual Machine Profiler Interface (JVMPI), and wherein the called function comprises a GetCallTrace function.

5. The method of claim 3, wherein the standard interface comprises Java Virtual Machine Tools Interface (JVMTI).

6. The method of claim 2, wherein thread states include running, asleep, suspended, and monitor block.

7. The method of claim 1, further comprising displaying statistical information from the status data via a user interface.

8. The method of claim 1, wherein the periodic sampling is sufficiently infrequent so as to keep performance degradation of the application at less than a predetermined percentage.

9. The method of claim 1, wherein the application comprises a Java application, and wherein the status of said threads is sampled using a call to a function of a standard interface to a Java Virtual Machine (JVM).

10. The method of claim 9, wherein the standard interface comprises Java Virtual Machine Profiler Interface (JVMPI), and wherein the called function comprises a GetThreadStatus function.

11. The method of claim 9, wherein the standard interface comprises Java Virtual Machine Tools Interface (JVMTI).

12. The method of claim 1, wherein the periodically-sampled status data includes sufficient samples to provide an expected error rate less than a predetermined level.

13. The method of claim 1, wherein the lock contention found excludes lock contention in not-of-interest modules.

14. The method of claim 1, further comprising aggregating statistics over a thread group.

15. The method of claim 1, wherein the application comprises a deployed application.

16. The method of claim 1, wherein said periodically sampling is performed by execution of a separate control thread in addition to the threads of the multi-threaded application.

17. The method of claim 16, wherein execution of the multi-threaded application continues without intrusion in between samplings of said periodically sampling.

18. The method of claim 1, wherein said periodically sampling is performed at a frequency of no more than once per 100 milliseconds.

19. A method, implemented in a computer, of pinpointing lock contention, the method comprising:

periodically sampling, by the computer, status of a plurality of threads in a multi-threaded application to obtain periodically sampled status data, wherein the status includes state information and location information;

accumulating the periodically sampled status data, wherein the location information for a thread is accumulated only if the status indicates that the thread is in a block monitor state;

determining probable locations of lock contention by the plurality of threads in the multi-threaded application based on the accumulated periodically sampled status data for each of the plurality of threads by calculating a percentage of time said each of the plurality of threads spent waiting on a lock and determining a location of the waiting; and displaying information describing the probable locations of lock contention, if any.

20. The method of claim 19, wherein the location information includes module and line information usable in pinpointing the lock contention.

21. A computer system for pinpointing lock contention in a multi-threaded application running on the system, the system comprising:

memory having instructions stored thereon;

a processor configured by the instructions to:

periodically sample status of a plurality of threads in the multi-threaded application to obtain periodically sampled status data, wherein the status data includes location information;

accumulate the periodically sampled status data;

locate a lock contention based on the accumulated periodically sampled status data for each of the plurality of threads by calculating a percentage of time said each of the plurality of threads spent waiting on a lock and determining a location of the waiting; and display information from the accumulated periodically sampled status data describing a location of the lock contention, if any, within the multi-threaded application.

* * * * *